US008229278B2

(12) United States Patent
Eklund et al.

(10) Patent No.: US 8,229,278 B2
(45) Date of Patent: Jul. 24, 2012

(54) PORTFOLIOS IN DISC AUTHORING

(75) Inventors: Don Eklund, Yorba Linda, CA (US); Sumit Malik, Pasadena, CA (US); Raja Sahi, Los Angeles, CA (US); Tommy Choy, Lakewood, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 1525 days.

(21) Appl. No.: 11/467,882

(22) Filed: Aug. 28, 2006

(65) Prior Publication Data

US 2007/0077039 A1  Apr. 5, 2007

Related U.S. Application Data

(60) Provisional application No. 60/712,664, filed on Aug. 29, 2005, provisional application No. 60/712,684, filed on Aug. 29, 2005.

(51) Int. Cl.
    *G11B 27/00* (2006.01)
(52) U.S. Cl. ...................................................... 386/278
(58) Field of Classification Search .................. 386/125
    See application file for complete search history.

(56) References Cited

U.S. PATENT DOCUMENTS

| 3,088,996 A | 5/1963 | Carter |
| 5,307,456 A | 4/1994 | Mackay |
| 5,907,704 A | 5/1999 | Gudmundson et al. |
| 6,404,711 B1 | 6/2002 | Kato |
| 6,453,459 B1 * | 9/2002 | Brodersen et al. ............ 717/100 |
| 6,807,363 B1 | 10/2004 | Abiko et al. |
| 7,371,068 B2 * | 5/2008 | Lloyd et al. .................... 434/262 |
| 2002/0112226 A1 | 8/2002 | Brodersen et al. |
| 2002/0174438 A1 | 11/2002 | Cleary et al. |
| 2003/0193520 A1 | 10/2003 | Detzel |
| 2004/0167916 A1 | 8/2004 | Basso et al. |
| 2004/0210896 A1 | 10/2004 | Chou et al. |
| 2004/0220791 A1 | 11/2004 | Lamkin et al. |
| 2004/0240360 A1 | 12/2004 | Kim et al. |
| 2005/0013593 A1 | 1/2005 | Jung et al. |
| 2005/0114909 A1 | 5/2005 | Mercier |
| 2005/0155058 A1 | 7/2005 | Jung et al. |
| 2005/0185929 A1 | 8/2005 | Kang et al. |
| 2006/0165388 A1 | 7/2006 | Uesaka et al. |

(Continued)

FOREIGN PATENT DOCUMENTS

JP  2000-040296 A  2/2000

(Continued)

OTHER PUBLICATIONS

International Search Report and Written Opinion issued in PCT/US06/34307 on Oct. 18, 2007.

(Continued)

*Primary Examiner* — William C Vaughn, Jr.
*Assistant Examiner* — Daniel Tekle
(74) *Attorney, Agent, or Firm* — Samuel S. Lee; Procopio, Cory, Hargreaves & Savitch LLP

(57) ABSTRACT

Authoring a Blu-ray Disc including: defining an initial project and exporting portfolios from the initial project, where the portfolios include portions of the initial project. The portfolios are sent to vendors who enter information into the portfolios. The portfolios are then sent to a disc author who assembles the information from the portfolios into a master project for making a Blu-ray Disc.

19 Claims, 15 Drawing Sheets

U.S. PATENT DOCUMENTS

2006/0277588 A1    12/2006    Harrington et al.

FOREIGN PATENT DOCUMENTS

| WO | WO03021458 | 3/2003 |
| --- | --- | --- |
| WO | 2004-034395 A1 | 4/2004 |
| WO | WO2005002232 | 1/2005 |

OTHER PUBLICATIONS

International Search Report and Written Opinion issued in PCT/US2006/34316 on Aug. 2, 2007.

International Search Report and Written Opinion issued in PCT/US2006/33915 on Apr. 12, 2007.

International Search Report and Written Opinion issued in PCT/US06/34309 on Apr. 9, 2007.

International Search Report/Written Opinion issued in PCT/US06/26058 on Jun. 27, 2008.

International Search Report/ Written Opinion issued in PCT/US06/34191 on Jul. 14, 2008.

International Search Report/ Written Opinion issued in PCT/US06/34190 on Jul. 8, 2008.

International Search Report and Written Opinion issued in PCT/US2006/34306 on Aug. 29, 2007.

Supplementary European Search Report issued in related European Patent Application No. 06802841.4, on May 20, 2001, 11 pages.

Huges, Kilroy, "The Tools and Twists of DVD Authoring", EMedia Professional, vol. 10, No. 12, Dec. 1, 1997, pp. 37-40, 42, 44-46, 48 and 50, XP002110307, ISSN: 10-90-946X.

Blu-Ray Disc: "White paper Blu-ray Disc Format 2.B Audio Visual Application Format Specifications for BD-ROM", internet citation, Mar. 31, 2005, XP-007903517, http://www.blu-raydisc.com/assets/downloadablefile/2b_bdrom_audiovisualapplication_0305-12955-13403.pdf, retrieved on Nov. 16, 2007, 35 pages.

Office Action dated Oct. 19, 2010 in Chinese Patent Application No. 200680040625.4.

* cited by examiner

PORTFOLIOS IN DISC AUTHORING

RELATED APPLICATION

This application claims the benefit of priority of U.S. Provisional Patent Application Ser. No. 60/712,664, entitled "Disc Authoring" and U.S. Provisional Patent Application Ser. No. 60/712,684, entitled "Abstractions in Disc Authoring", both filed Aug. 29, 2005. This application is also related to U.S. patent application Ser. No. 11/467,896, entitled "Abstractions in Disc Authoring", filed on the same day as this application. The disclosures of the above-referenced patent applications are hereby incorporated by reference.

BACKGROUND

The present invention relates generally to disc authoring and, more particularly, to portfolios that allow users to generate content in a parallel fashion in authoring optical discs such as Blu-ray Discs.

A media authoring system is typically used to generate articles of media that are compliant with a particular standard. For example, a Digital Versatile Disc (DVD) authoring system is used to generate data, such as audio and video data and information used to present and access the audio and video data, on a DVD. The data on the disc is stored according to standards defined for DVD. Similarly, a Blu-ray Disc (BD) authoring system is used to create optical discs storing information according to the standards defined for BD.

SUMMARY

Implementations of the present invention include systems and methods to implement techniques for disc authoring using portfolios that allow users to generate content in a parallel fashion, such as in authoring optical discs compliant with Blu-ray Disc.

In one implementation, a method of managing a project for authoring a Blu-ray disc (BD) includes: defining an initial project; exporting portfolios from the initial project, wherein the portfolios include portions of the project associated with a particular task; sending the portfolios to vendors; entering information into the portfolios by the vendors, thereby generating updated portfolios; and sending the updated portfolios to a disc author, wherein the disc author validates the information in the updated portfolio, and if the information is valid, assembles the portfolio into a master project, otherwise exporting a new portfolio and sending it to the vendor.

Information entered into the portfolios by the vendors can include menu data, video data, audio data, and other graphics, such as, game data.

In another implementation, a system of managing a project for authoring Blu-ray disc (BD) includes: a client workstation configured to receive information about assets that are included with a project, to generate a project list, and to export portfolios from the project list; a vendor workstation configured to receive the portfolios and vendor information, and to output an updated portfolio; and a disc authoring workstation configured to receive updated portfolios, and to assemble the updated portfolios into a master project. The disc authoring workstation can also be configured to create and submit portfolios from the master project.

In another implementation, a method of managing a project for authoring a Blu-ray disc (BD) includes: creating a portfolio by a vendor, wherein the portfolio includes entries based upon a model project associated with a particular task; entering information into the portfolios by the vendors, thereby generating updated portfolios; and sending the updated portfolios to a disc author, wherein the disc author validates the information in the updated portfolio, and if the information is valid, assembles the portfolio into a master project, otherwise exporting a new portfolio and sending it to the vendor.

In another implementation, a computer program, stored in a computer-readable storage medium, for managing a project for authoring Blu-ray disc (BD), includes executable instructions that cause a computer to: define an initial project; and export portfolios from the initial project, wherein the portfolios include portions of the project associated with a particular task.

In still another implementation, a computer program, stored in a computer-readable storage medium, for managing a project for authoring Blu-ray disc (BD), includes executable instructions that cause a computer to: receive portfolios; and enter information into the portfolios specified by the vendors to generate updated portfolios.

In yet another implementation, a computer program, stored in a computer-readable storage medium, for managing a project for authoring Blu-ray disc (BD), includes executable instructions that cause a computer to: receive updated portfolios; validate information in the updated portfolios; and assemble the update portfolios into a master project if the information is valid, otherwise export a new portfolio from the master project and send the new portfolio to a vendor.

The techniques have been described using BD, but the techniques are also applicable to DVD, HD-DVD, and iHD.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be understood in part by studying the accompanying drawings, in which like reference numerals refer to like parts, and in which.

DETAILED DESCRIPTION

As will be further described below, implementations of the present invention provide an efficient structure and configuration in authoring articles of media that are compliant with a particular standard. In one implementation, a Blu-ray Disc (BD) authoring system executes instructions to store information based on the BD standard specifications using portfolios that allow users to generate content in a parallel fashion.

After reading this description it will become apparent to one skilled in the art how to implement the invention in various implementations and applications. However, although various implementations of the present invention will be described herein, it is understood that these implementations are presented by way of example only, and not limitation. As such, this detailed description of various implementations should not be construed to limit the scope or breadth of the present invention as set forth in the appended claims.

In one implementation, the BD Read Only Memory(BD-ROM) specification provides a number of data structures that needs to be defined on a BD in order for the disc to behave as desired. The BD-ROM specification defines BD Prerecorded and BD Recordable application formats.

Figure 1:
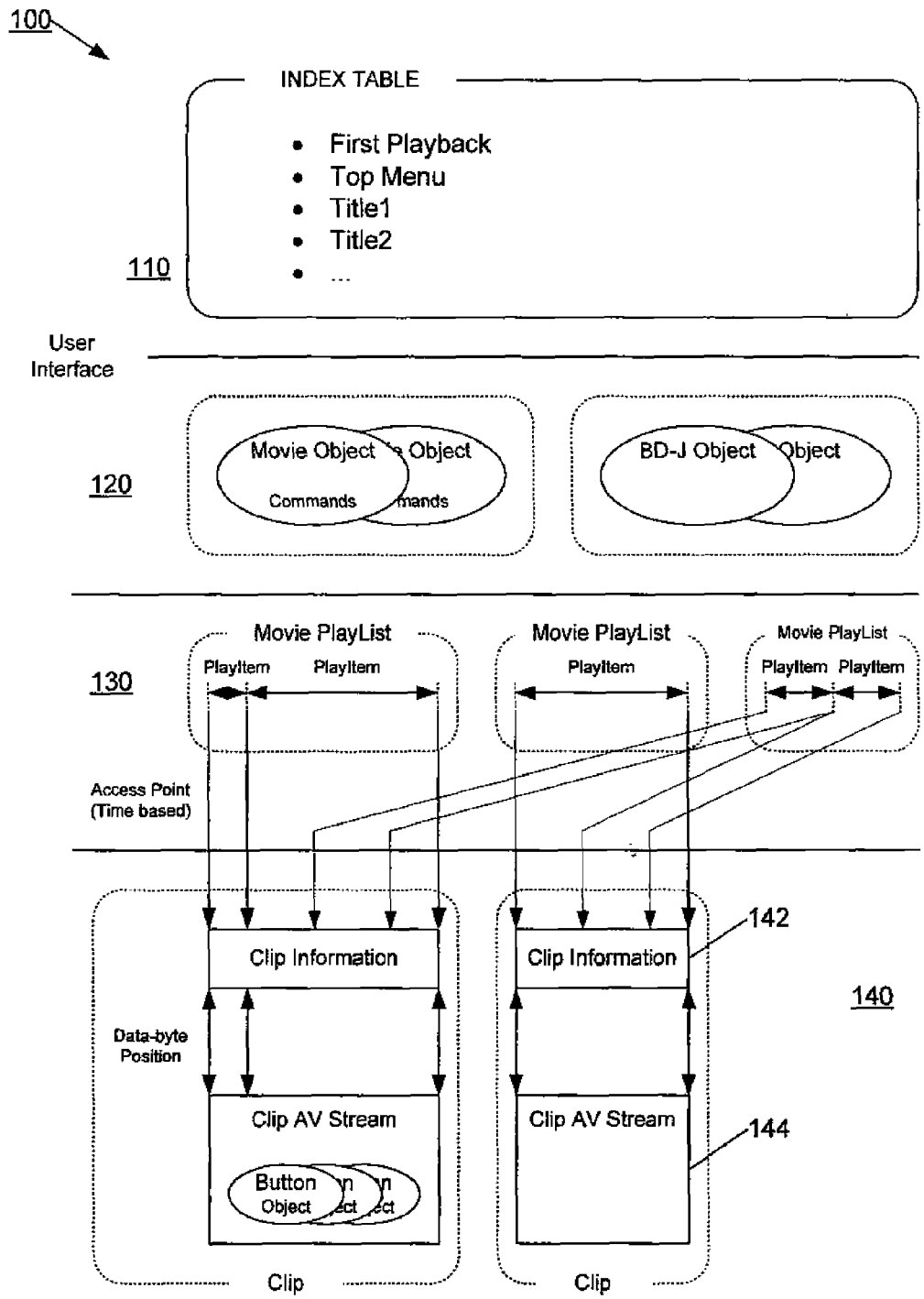
FIG. 1 provides a simplified overview of the BD-ROM data structure.

FIG. 1 provides a simplified overview of the BD-ROM data structure 100. In general, BD-ROM has four layers for managing AV stream files as follows: Index Table 110, Movie Object/BD-J Object 120, Playlist 130, and Clip 140.

Figure 2:
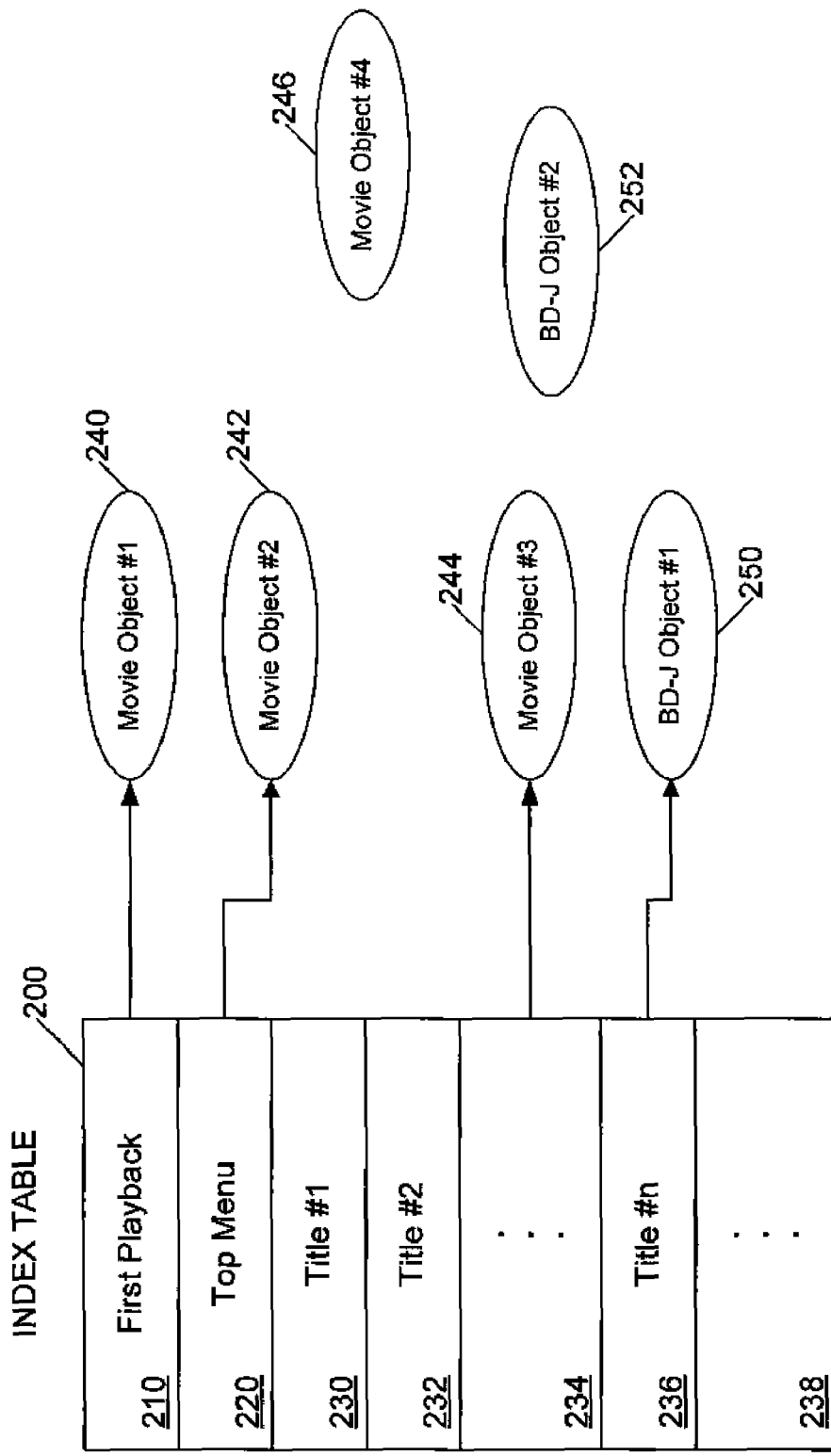
FIG. 2 shows Index Table, which is a top-level table structure that defines the Titles of a BD-ROM disc.

An example Index Table 200, shown in FIG. 2, is a top-level table structure that defines the Titles of a BD-ROM disc. A Title corresponds to any entry in the Index Table including First Playback 210, Top Menu 220, and Titles 230, 232, 234, 236, 238. First Playback 210 is used by content providers to perform automatic playback. Each Index Table entry links to either a Movie Object 240, 242, 244, 246 or BD-Java (BD-J) Object 250, 252. The disc player references this table whenever a title is to be executed (e.g. whenever the Title Search or Menu Call operation is called).

Figure 3:
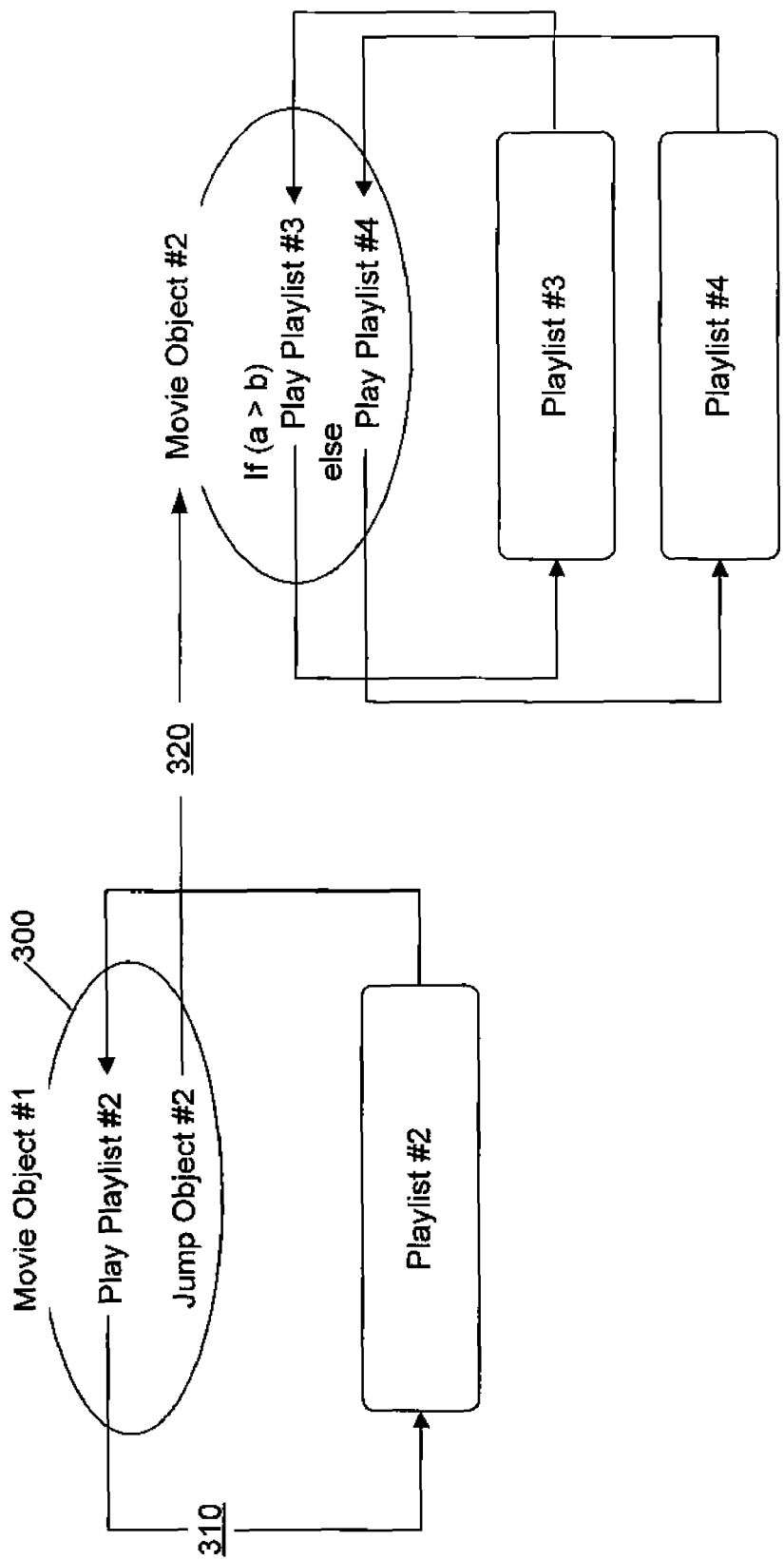
FIG. 3 illustrates one example of a Movie Object including navigation commands that can launch Playlist playback or another Movie Object.

A Movie Object includes executable lines of codes or navigation commands which enables dynamic scenario description. Thus, as shown in FIG. 3, navigation commands in a Movie Object (e.g., 300) can launch Playlist playback 310 or another Movie Object 320. This enables the content providers to define a set of Movie Objects for managing playback of Playlists in accordance with a user's interaction and preferences.

When a Title associated with a BD-J Object in the Index Table on disc is selected, the corresponding application is automatically launched and its lifecycle is bound to the Title. A BD-J application is a Java Xlet which is controlled by the BD-ROM player's Application Manager through its Xlet interface. The Xlet interface has four states as follows: loaded, paused, active and destroyed. Once a BD-J application is destroyed, any resources allocated to it, such as memory and AV control, is released.

Figure 4:
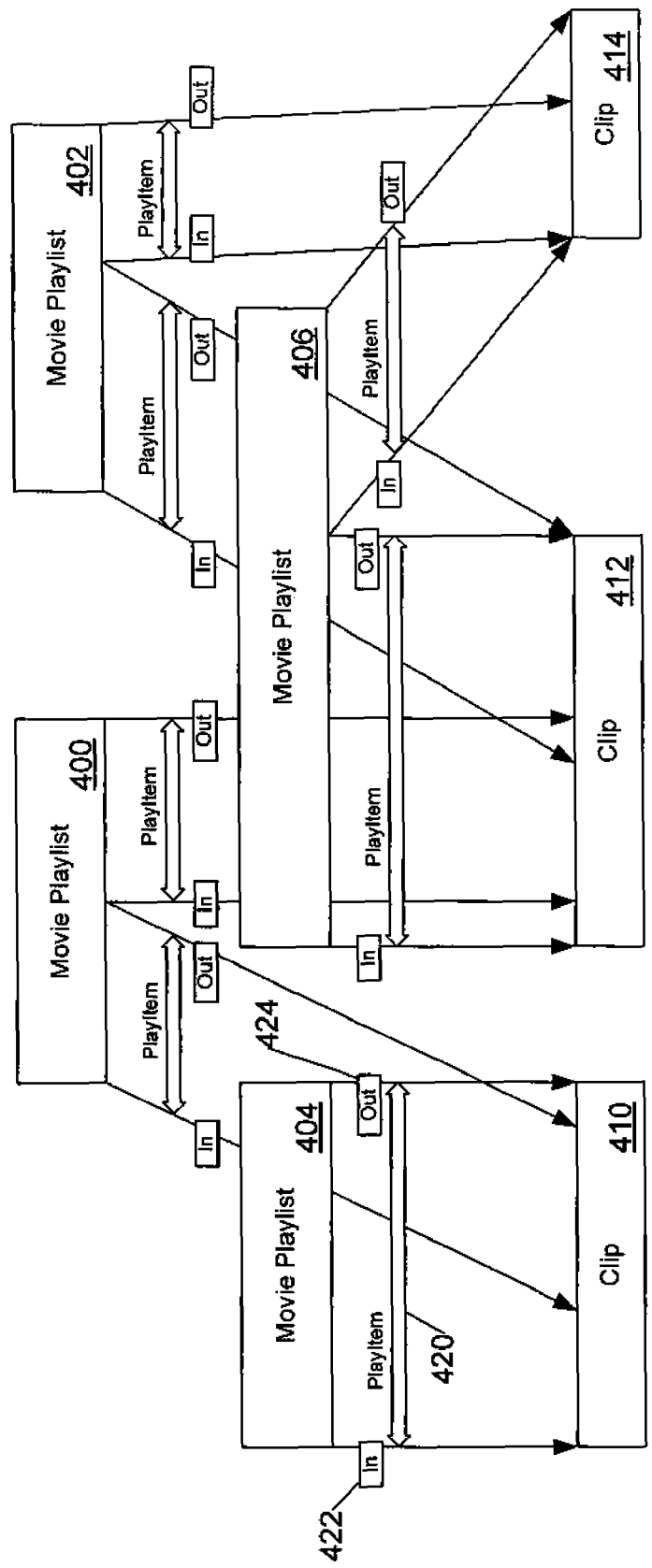
FIG. 4 illustrates one example of Playlists, which are a collection of playing intervals in the Clips that indicates which portion of the Clip to play and when to play the Clip.

A Playlist (i.e., "Movie Playlist") 400, 402, 404, 406, illustrated in FIG. 4, is a collection of playing intervals in the Clips 410, 412, 414 that indicates which portion of the Clip to play and when to play the Clip. One such playing interval is called a PlayItem (e.g., 420) and includes an IN-point (e.g., 422) and an OUT-point(e.g., 424), each of which refers to positions on a time axis of the Clip. The IN-point indicates a start point of a playing interval, and the OUT-point indicates an end point of the playing interval.

Referring back to FIG. 1, an AV stream file together with its associated database attributes is considered to be one object. In the context of the BD-ROM data structure, the AV stream file is referred to as a Clip AV stream file 144, and the associated database attribute file is referred to as a Clip Information file 142. An object including the Clip AV stream file 144 and its corresponding Clip information file 142 is referred to as a Clip 140.

The Clip Information file 142 stores the time stamps of the access point into the corresponding AV stream file 144. The BD player reads the Clip Information file 142 to find out the position where it should begin to read the data from the Clip AV stream file 144. Therefore, there is a one-to-one relationship between a Clip AV stream file 144 and a Clip Information file 142.

Figure 5:
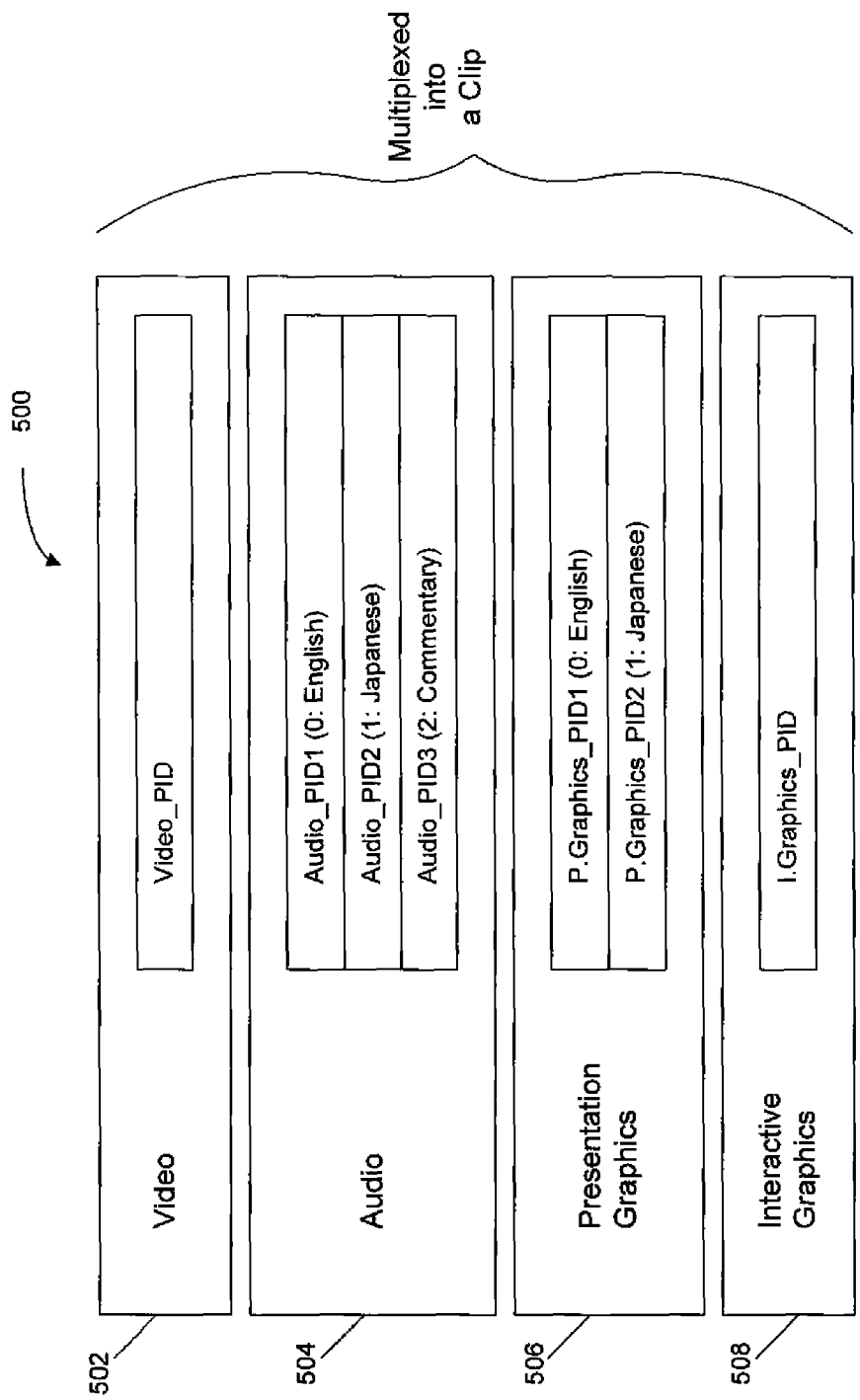
FIG. 5 is a block diagram of an example Clip.

FIG. 5 is a block diagram of an example Clip 500 including Clip AV stream. In the example of FIG. 5, the Clip 500 includes four types of streams, video streams 502, audio streams 504, presentation graphics streams 506, and an interactive graphics stream 508. In other implementations, the Clip 500 can include different numbers of streams as well as different types of streams. For example, the Clip 500 can include a primary video stream, a secondary video stream, and additional graphics streams. The clip can also have fewer streams, for example, the Clip 500 may not include an audio stream, or a video stream, or graphic stream.

In one implementation, a BD Authoring System (BDAS) provides portfolios. Authoring systems usually allow a user to create Projects for generating content for discs, such as DVD, BD-ROM, or HD-DVD. Each Project is a data set that can be a collection of the content of one or more discs. Typically, all the data defined in the Project is put on the discs defined in the Project. Some authoring applications may expose a temporary work area for a user. Further, most authoring systems are single user authoring systems in that each Project is being worked on by only one person at one time. In case multiple people need to work on a Project, parallel Projects need to be set up that would be combined manually at a later point in time. However, this has a disadvantage in that all the users of the Project are constrained by the same set of rules that apply in setting up the Project. Thus, a lot of unnecessary work may have to be done in order to accomplish the tasks in a parallel fashion.

The BDAS offers the use of "Portfolios" to overcome these and other problems. Portfolios are top level entities that allow users to create content in a parallel fashion. There are different types of Portfolios that are available depending on the content that is to be put in the Portfolio. The different Portfolio types are created so as to optimize the workflow for the person using that Portfolio. The BDAS also offers mechanisms to synchronize the data in the Project to data in Portfolios making the process of the data combination between Projects and Portfolios easy. The BDAS supports both importing data from a Portfolio to a Project, and exporting data from a Project to a Portfolio.

Further, the BDAS provides mechanisms to link data present in a Portfolio to data in a Project, and vice-versa, to make the process of combination easier. Visual cues can be presented when link data between a Project and a Portfolio are not the same, such as when one of them has been modified.

Figure 6:
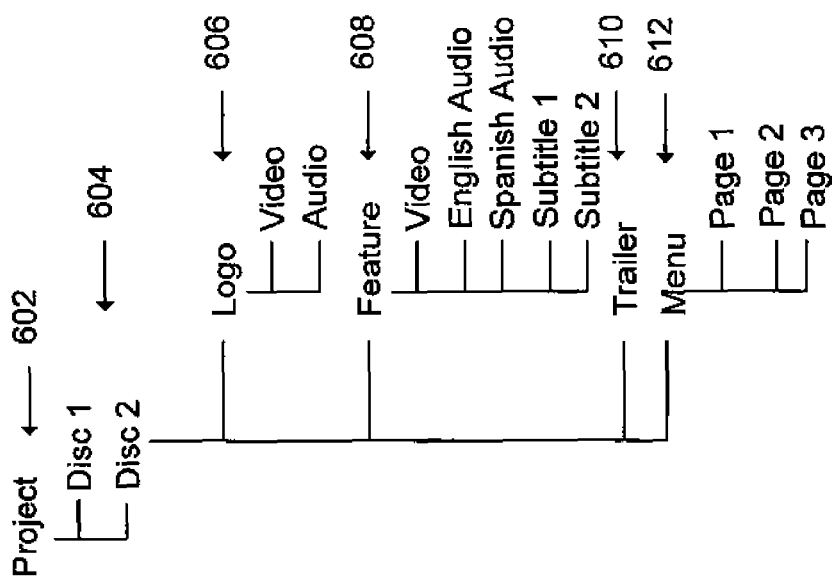
FIG. 6 is a diagram illustrating aspects of an example project.

FIG. 6 is a diagram illustrating aspects of an example project. As shown in FIG. 6, a project 602 can be displayed as a directory structure. A project typically includes at least one disc 604. In this example, the project 602 includes two discs, Disc 1 and Disc 2. In other embodiments, a project can include a single disc, or any number of discs. For example, if a project is very large it may require additional discs.

In FIG. 6, Disc 2 is expanded to show that it includes subdirectories that represent content on the disc such as a logo 606, a feature 608, a trailer 610, and a menu 612. Additional details, or specifics of the content, may be included under each of these subdirectories. For example, the logo subdirectory 606 may include a video stream and an audio stream. The Feature may include a video stream, English and Spanish audio streams, and subtitles. In addition, the menu may include multiple pages.

The project 602 in FIG. 6 may be created by a client, or producer, of the project when the project 602 is first created, it functions as an outline of what the final project should include. For example, the initial project can include a logo, with additional subdirectories for video and audio under the logo subdirectory. But, the actual video and audio files do not need to be included in the project at this time. That is, these subdirectories can function as placeholders to be filled in later, by the client or others during the development of the project.

The client lays out the basic structure that they want the project to follow. For example, the client knows that they want to include both English and Spanish language with the feature such that a user can select either of the two languages when viewing the feature. There can be additional detail provided in the project 602 by the client so that, as described further below, others working on the project 602 can provide additional input to help create a final version of the project 602.

Figure 7:
FIG. 7 is a diagram illustrating further processing of a project.

FIG. 7 is a diagram illustrating further processing of a project. Following an initial lay out of a project 602, portfolios can be generated. In FIG. 7, the menu 612 subdirectory has been expanded to show additional subdirectories under page 1 and page 2. Menu page 1 includes a menu for selecting to Play the feature or the trailer, and menu page 2 includes a menu for selecting English or Spanish audio.

In this example, information defining menu page 1 and menu page 2 are going to be provided by different entities. For example, the two menus may be provided by two different vendors, or by two different individuals working for the same vendor. Since the menus will be provided by different entities, two portfolios 702 and 704 are generated. A first portfolio 702 includes portions of the overall project that are needed by the entity that is providing menu page 1, and a second portfolio 704 includes portions of the overall project that are needed for the entity that is providing menu page 2.

For example, in the first portfolio 702, the logo 606 portion of the project has been removed, along with the subdirectories for menu 612 pages 2 and 3. In the second portfolio 704, the logo 606 portion, the trailer portion 610, and the subdirectories for menu 612 pages 1 and 3 have been removed. In this way, portions of the project that are needed by an entity that is completing a part of the project are included in the portfolio that is provided to that entity. The portfolio can include enough structure of the overall project so that a vendor, or entity, know how their piece fits into the overall project, but other portions of the project that are not needed do not have to be given to the vendor. It is noted that when a portfolio is created it may, or may not, include the actual video, audio, and subtitle assets that exist in the project. Typically, an asset will only be included if it is relevant to the entity that is working on the portfolio.

Figure 8:
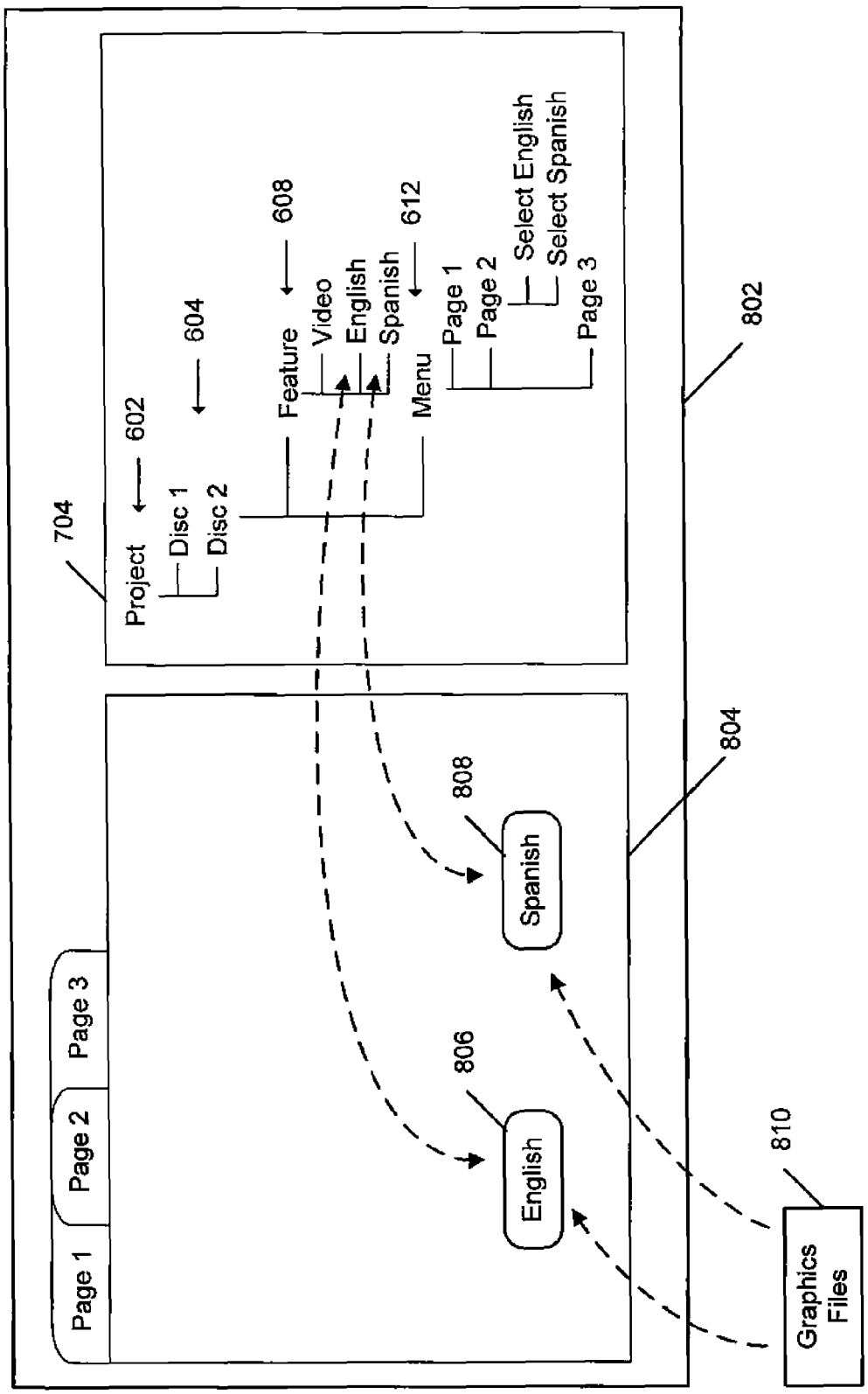
FIG. 8 is a diagram illustrating an example of a vendor providing input for a portfolio.

FIG. 8 is a diagram illustrating an example of a vendor providing input for a portfolio. In FIG. 8, portfolio 704 has been provided to a vendor. Using a version of BDAS, the vendor can display the portfolio 704 on a workstation display 802. The display 802 can also provide a work area 804 for the vendor to enter information that will be included in the portfolio 704. In FIG. 8, the vendor is supplying information for menu page 2. Menu page 2 provides selection between English and Spanish audio when the feature is played. The vendor creates an English selection button 806 and a Spanish selection button 808. The vendor can create the selection buttons using various tools. For example, the vendor can import graphics files 810 to create the buttons, use a drawing tool, or other tools to create a desired button.

Once the buttons have been created, and located onto the work area 804 in a desired location, the vendor can link the buttons to the desired function. In this example, the vendor links the English button to the English subdirectory in the feature 608 and the Spanish button to the Spanish subdirectory in the feature 608. For example, the vendor can click and drag the English button 806 into the English subdirectory, or click and drag the English audio entry in the project tree onto the English button, or any other technique to associate the two to each other. When a vendor completes inputting the updating information into a portfolio, the updated portfolio is sent back to a disc author.

It is noted that the client, vendor, and disc author can all have versions of the BDAS. They can all have the same version of the BDAS, or different versions of the BDAS. For example, the disc author may have full version of the BDAS with all of the functions enabled, while the client and vendors may have other more limited versions of the BDAS with only functions that are needed for the particular tasks to be used by the vendor and client. Thus, different versions of the BDAS, with different functions and capabilities, can be distributed to different individuals depending on the functions the individual needs to perform their tasks in the overall development of the project.

Figure 9:
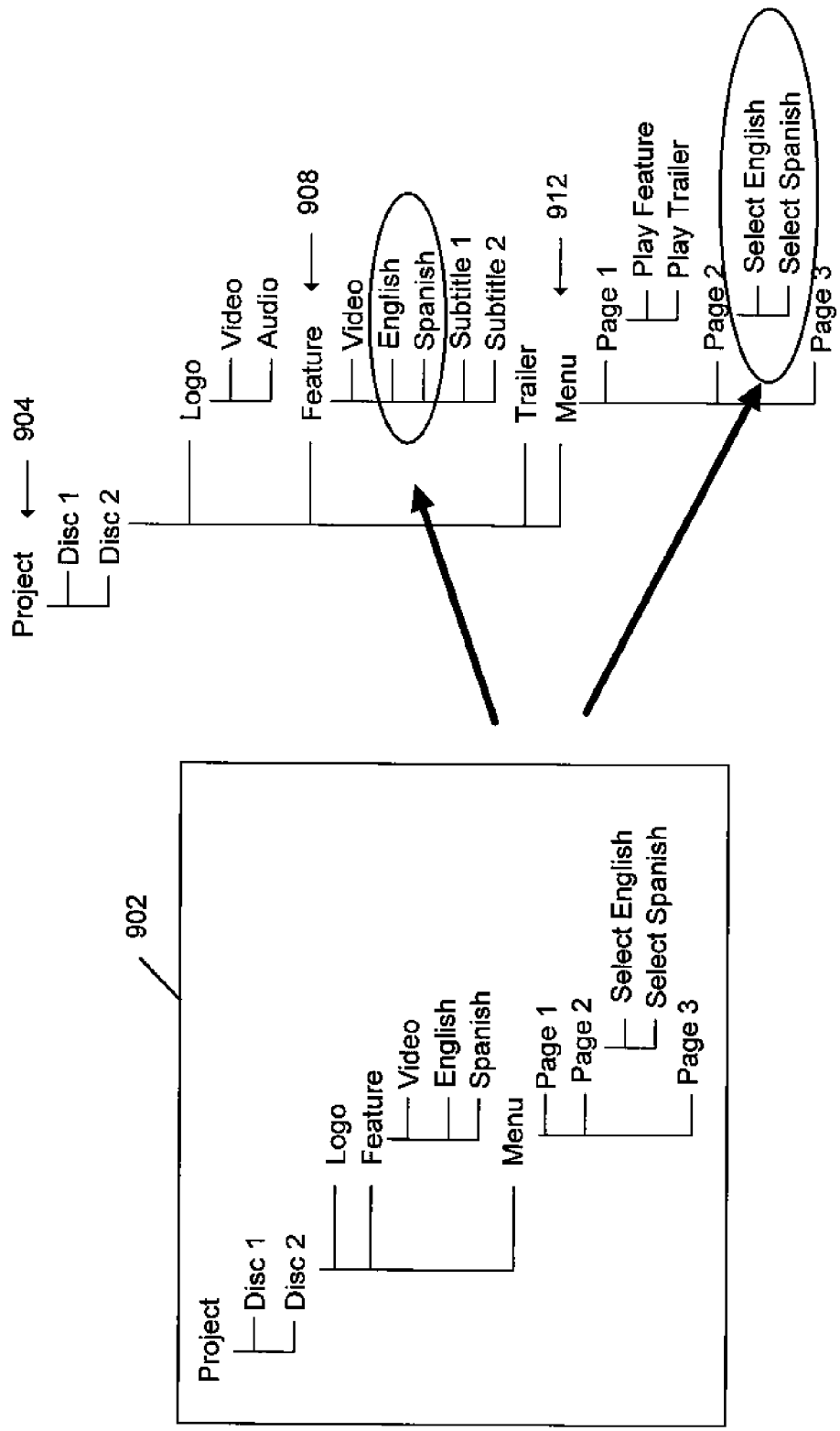
FIG. 9 is a diagram illustrating integrating an updated portfolio into a project.

FIG. 9 is a diagram showing integration of an updated portfolio into a project. The diagram shows an updated portfolio 902 that has been updated as described in the discussion of FIG. 8. The updated portfolio 902 is provided back to a disc author. The disc author also has a master copy of the project 904 that the author is assembling. The disc author checks the updated portfolio 902 to validate its contents. For example, the disc author can validate the acceptability of formats of graphics files that are in the updated portfolio 902, the validity of any commands, and the like.

Once the updated portfolio 902 has been validated, the disc author imports the updated portfolio 902 into the master project 904. When importing updated portfolios into the master project 904, only the portions of the master project 904 that are new or updated in the updated portfolio are imported. For example, in FIG. 9, only the English and Spanish buttons in Menu 912 page 2 and the corresponding links to the English and Spanish audio in the feature 908 subdirectory are updated in the master project 904.

Using portfolios allows multiple vendors, or entities, to work on different portions of the project at the same time. For example, one vendor can update page 1 of the menu and a different vendor can update page two of the menu. Another example is that one vendor works on the menu, while another vendor works on subtitles, and another on the audio and video assets. After the different vendors complete their updates, updated portfolios can be sent to the disc author who updates the master project.

Figure 10:
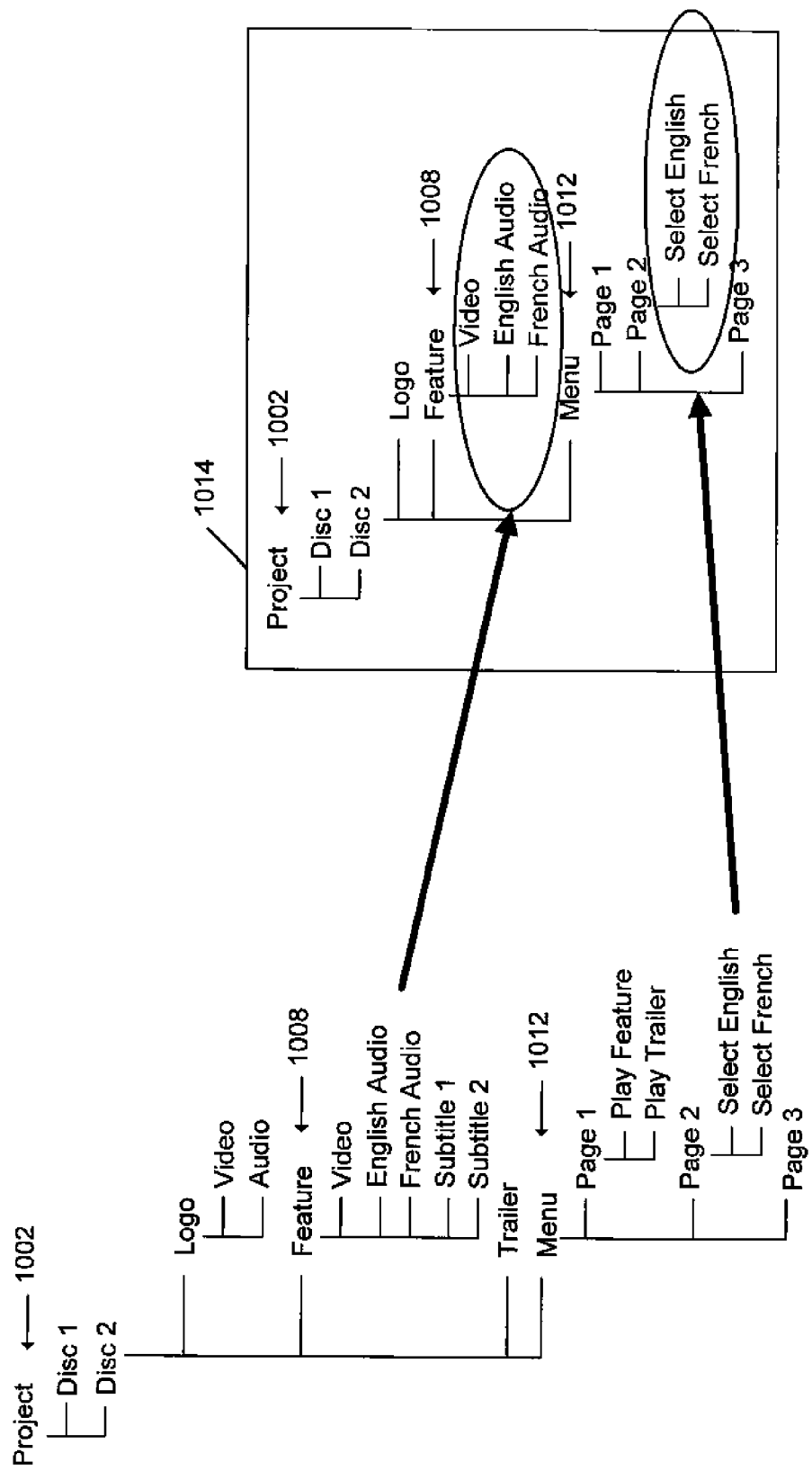
FIG. 10 is a diagram illustrating a change in a master project.

During the development of a master project, there will typically be changes. FIG. 10 is a diagram illustrating a change in a master project 1002. In this example, the feature 1008 is changed to include French audio instead of Spanish audio. Also, menu 1012 page 2 was changed to select French instead of Spanish. The disc author can export a new portfolio 1014 that can be sent to a vendor to have the changes incorporated. The new portfolio 1014 only needs to include portions of the master project 1002 that are needed by the vendor. For example, the new portfolio 1014 includes the feature 1008 indicating the French audio, and the menu 1012 page 2 with the French selection.

Figure 11:
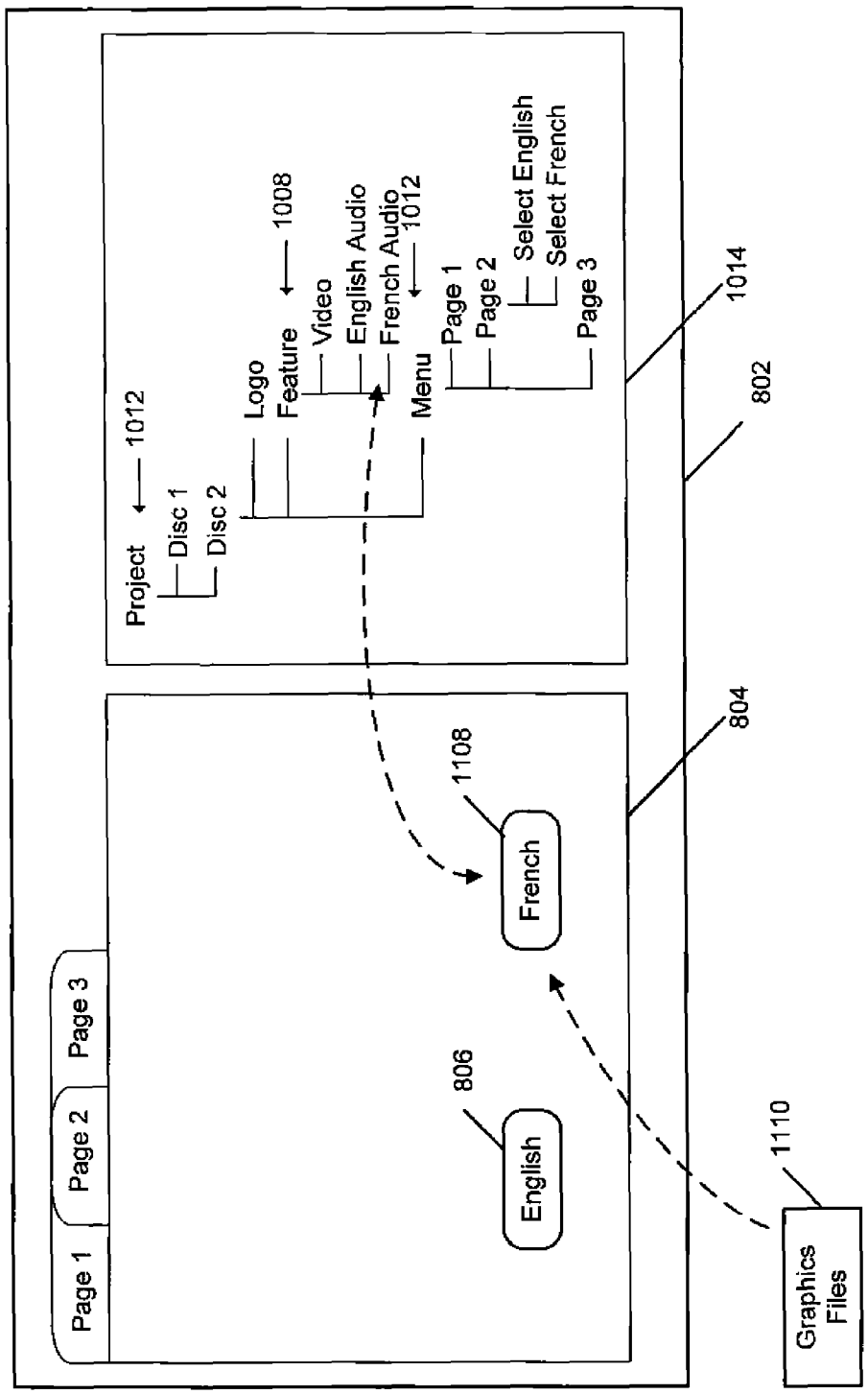
FIG. 11 is a diagram illustrating aspects of a vendor updating a portfolio.

FIG. 11 is a diagram illustrating aspects of a vendor updating a portfolio. Similar to the description for FIG. 8, using a version of BDAS, the vendor can display the new portfolio 1014 on a workstation display 802 that includes a work area 804 for the vendor to enter information that will be used to update the portfolio 1014. In FIG. 11, the vendor is updating the selection for French audio instead of Spanish audio. The vendor does not need to change the English selection button 806, and in this example, it is provided just so that the vendor sees the layout with both buttons. If desired, the English button portion of the master project 1014 would not need to be provided to the vendor. The vendor creates the French selection button 1108 using various tools and/or graphics files 1110.

Once the vendor has completed updating of the portfolio to reflect the desired changes, the updated portfolio can be sent back to the disc author. Then, similar to the description of FIG. 9, the master project can be updated to include the changes.

In addition to changes, the disc author may detect errors when assembling vendor input into the master project. For example, there may be errors when mapping items in a portfolio into a master project. For example, when bringing a portfolio into a master project, the BDAS maps the items in the portfolio to the master project. An error may occur during the mapping, for example, the name of an item may have changed, or there may be items removed or added.

As noted, a portfolio typically does not include the actual assets that are in the project. For example, the portfolio 1014 in FIG. 10 includes items representing the English and French audio files in the feature 1008 directory. The portfolio 1014 does not include the actual audio files themselves but only the links to the files. When the portfolio 1014 is sent to a vendor to be updated, the vendor may change the name of the link. For example, the vendor may change the name "feature" to "movie." Then when the disc author attempts to import the updated portfolio into the project, an error will occur because the "movie" will not map to an asset in the project.

If there is an error in mapping a portfolio item to a project asset, there are several options that the BDAS can provide. The BDAS can flag the portfolio item and notify the vendor of the error. In addition, the BDAS can analyze the project assets that are similar to the portfolio item and make suggestions to the vendor identifying possible assets that the item should be mapped to. For example, if a portfolio included an item for changing a feature's audio track to English and Spanish, but the project only includes English and French audio tracks, then the BDAS can flag the error and suggest to the vendor that there is an asset equivalent to the one assigned to the button (French audio file instead of Spanish audio file). The vendor can then decide if the button should be assigned to the equivalent asset or not. Other characteristics of the project asset can also be analyzed when determining what could be an equivalent asset. For example, the duration of an asset, or asset type (audio, video, subtitle), or other characteristics.

Figure 12:
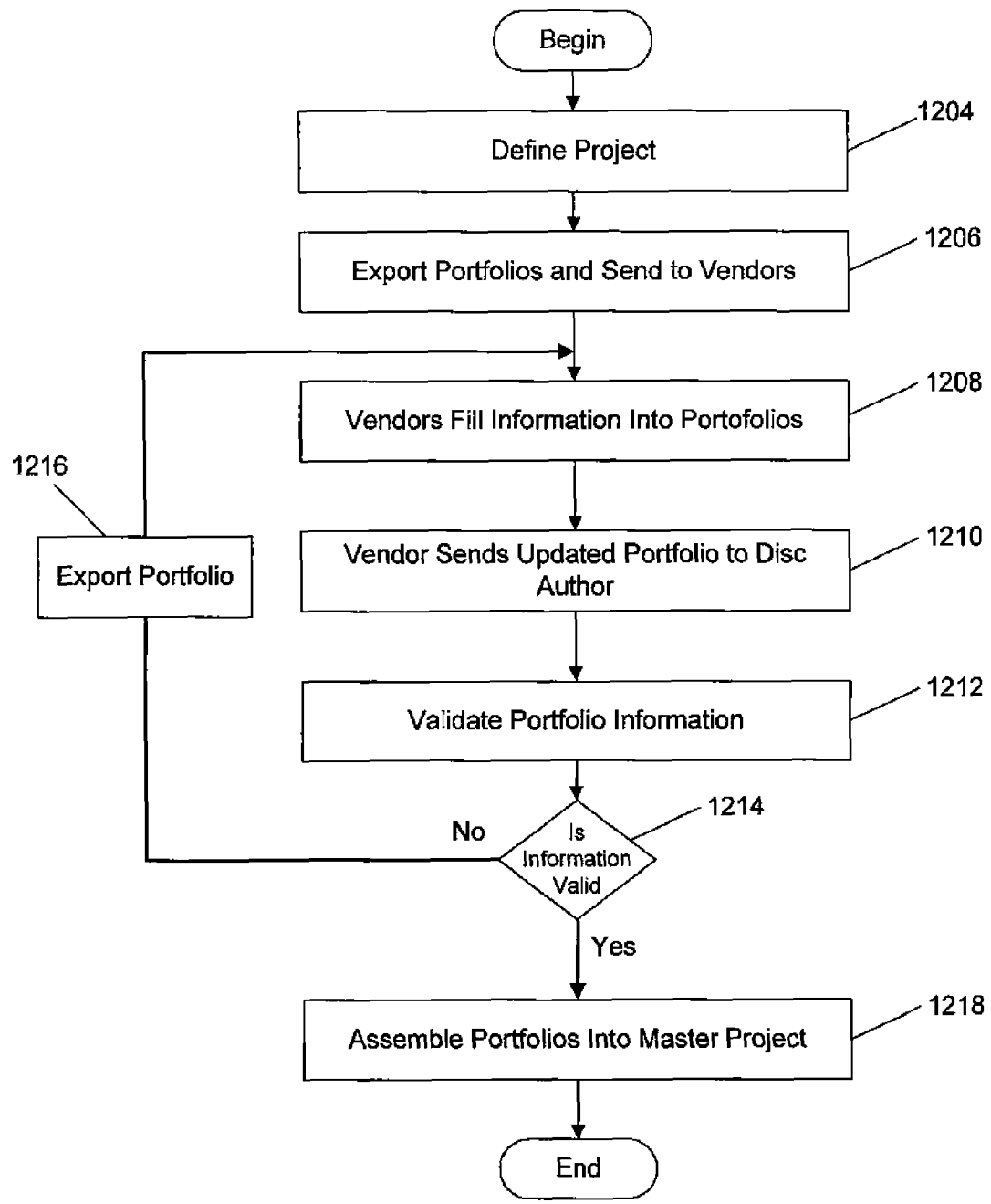
FIG. 12 is a flow diagram of a method of implementing a portfolio.

FIG. 12 is a flow diagram of a method of implementing a portfolio. A client defines a project at block 1204. After the project is defined, portfolios are exported from the project at block 1206 and sent to vendors. There may be multiple portfolios exported from a project, wherein a portfolio includes portions of the total project that are needed by a particular vendor so that the vendor can provide a desired input for use in the final project.

A vendor receives a portfolio, or multiple portfolios, and enters information into the portfolio at block 1208. For example, the vendor may be a "menu" vendor and the vendor may develop menu buttons and assign logic to the buttons. For example, the vendor may use drawing tools and graphics to build a button and then associate logic with the button so that a particular action is taken when an end user selects the button.

After the vendor inputs information into the portfolio, the updated portfolio is sent to a disc author at block 1210. At block 1212, the disc author validates the information in the portfolio. For example, the portfolio information can be validated to ensure that the information is a compatible format, that there are no logic errors, and so on.

If it is determined, at block 1214, that the portfolio information is not valid, then flow continues to block 1216. At block 1216, the disc author can export a new portfolio from the master project and send it back to the vendor to be updated. By exporting a new portfolio from the master project, the new portfolio will reflect any changes or revisions to the master project, so the vendor is provided with current project information.

Returning to block 1214, if it is determined that the portfolio information is valid, flow continues to block 1218 where the updated portfolio information is assembled into the master project that is maintained by the disc author.

Figure 13:
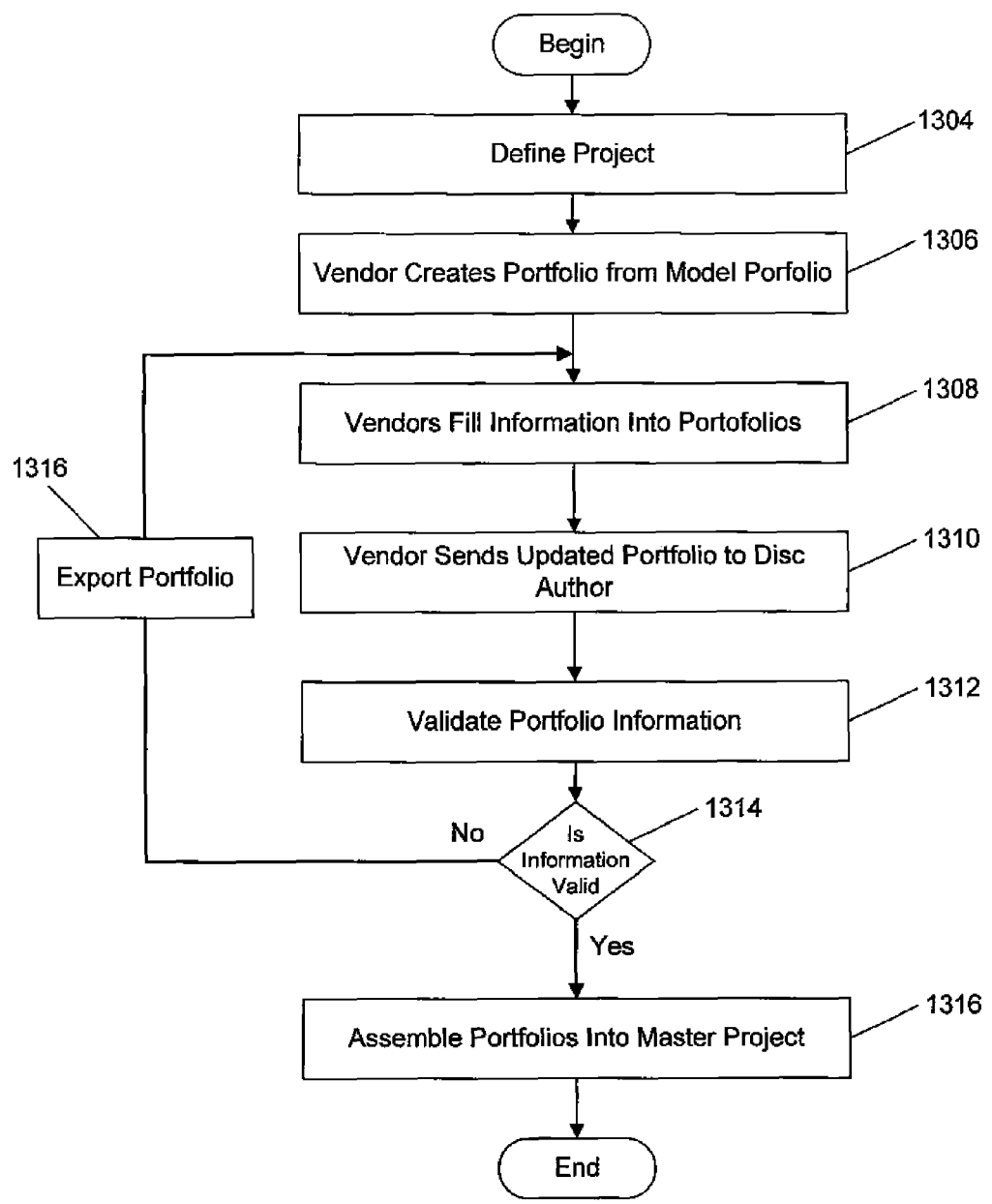
FIG. 13 is a flow diagram of another method of implementing a portfolio.

FIG. 13 is a flow diagram of another method of implementing a portfolio. A client defines a project at block 1304. Once a client has begun to define the project, but before the project is completely defined, flow continues to block 1306. In block 1306, a vendor creates a portfolio based upon a model, or previous, project. For example, the client can inform the vendor that a project for the North American market is being developed. The vendor can then create a portfolio based upon a North American model, or a previous portfolio used in a project targeted for the North American market. For example, a vendor, or multiple vendors, may create a portfolio that includes a menu page that lets a user select between English and Spanish audio tracks.

After the vendor creates a portfolio, or multiple portfolios, the vendor enters information into the portfolio at block 1308. For example, the vendor may be a "menu" vendor and the vendor may develop menu buttons and assign logic to the buttons. For example, the vendor may use drawing tools and graphics to build a button and then associate logic with the button so that a particular action is taken when an end user selects the button.

After the vendor inputs information into the portfolio, the updated portfolio is sent to a disc author at block 1310. At block 1312, the disc author validates the information in the portfolio. For example, the portfolio information can be validated to ensure that the information is a compatible format, that there are no logic errors, and so on. The disc author also maps the contents of the portfolio created by the vendor to the master project. Any discrepancies between the vendor's portfolio and the master project are identified.

If it is determined, at block 1314, that the portfolio information is not valid or there were errors during the mapping process, then flow continues to block 1316. At block 1316, the disc author can export a new portfolio from the master project and send it back to the vendor, with comments regarding invalid information and mapping errors, to be updated. By exporting a new portfolio from the master project, the new portfolio will reflect any changes or revisions to the master project. Thus, the vendor is provided with current project information.

Returning to block 1314, if it is determined that the portfolio information is valid, flow continues to block 1318 where the updated portfolio information is assembled into the master project that is maintained by the disc author.

Figure 14:
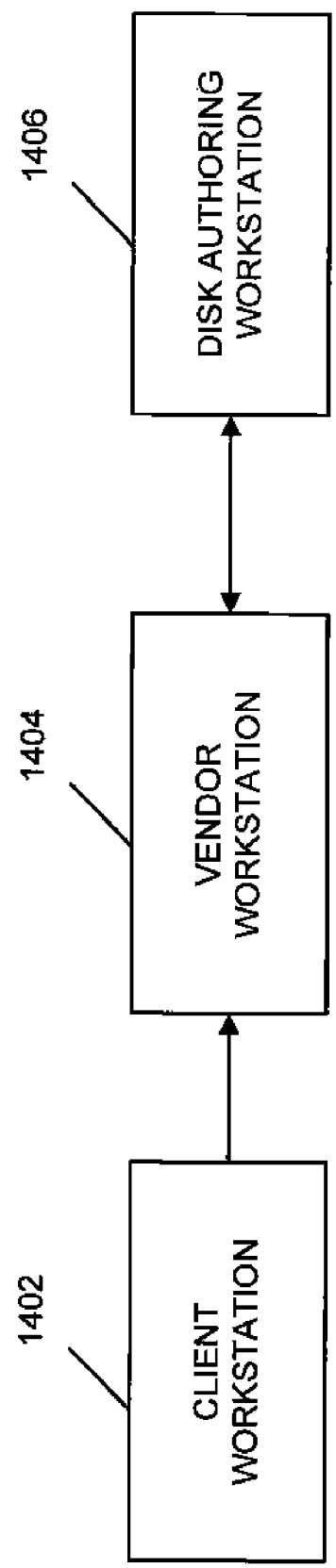
FIG. 14 is a block diagram illustrating an example system for managing authoring of a BD.

FIG. 14 is a block diagram illustrating an example system for managing a BD authoring. As shown in FIG. 14, there is a client workstation 1402 that is configured to define an initial project. The client work station 1402 is also configured to export portfolios from the initial project, wherein the portfolios include portions of the project associated with a particular task. The portfolios can be communicated to a vendor workstation 1404. The communication can be via a wide area network, such as the Internet, or other communication network.

The vendor workstation 1404 is configured to receive the portfolios from the client workstation 1402. The vendor workstation is also configured to allow the client to enter information into the portfolios, thereby generating updated portfolios. The updated portfolios can be communicated to a disc authoring workstation 1406. The communication can be via a wide area network, such as the Internet, or other communication network.

The disc authoring workstation 1406 is configured to receive the updated portfolios from the vendors. The disc authoring system will validate the information in the updated update portfolios. If the information is valid, it will assemble the updated portfolio into the master project. Otherwise, a new portfolio will be exported from the master project and sent to the vendor to be updated.

Figure 15A:
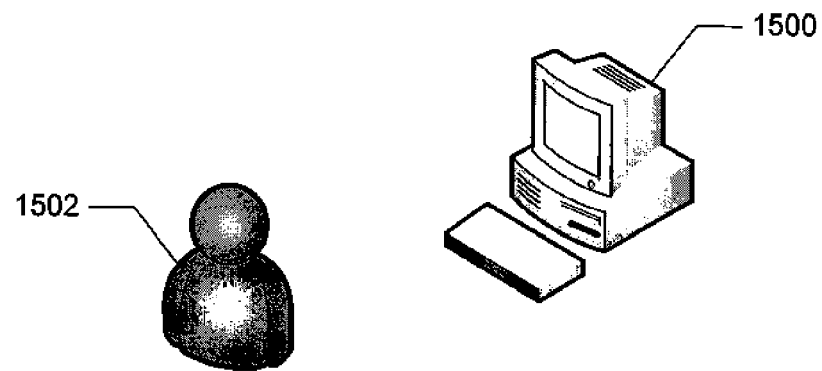
FIG. 15A shows a representation of a computer system and a user.

FIG. 15A shows a representation of a computer system 1500 and a user 1502. The user 1502 can use the computer system 1500 to author a Blu-ray disc. The computer system 1500 stores and executes a BD authoring system 1512 (shown in FIG. 15B), which receives BD-ROM data as an input and outputs portfolio data. In one example, the BD authoring system 1512 provides portfolios to assist in development of a project.

Figure 15B:
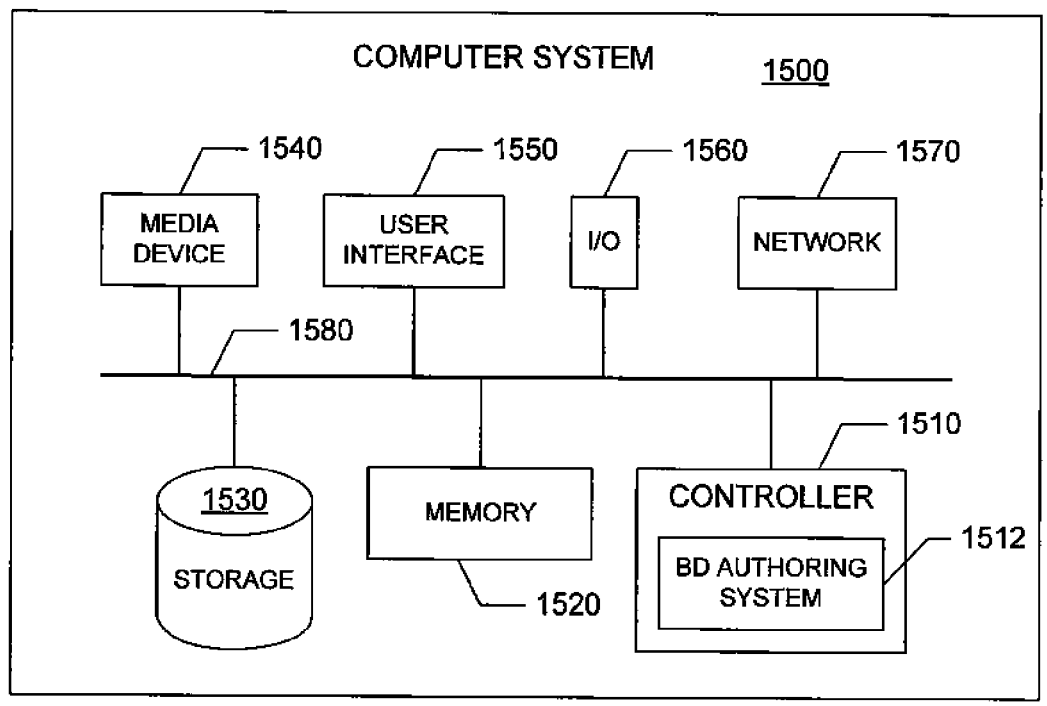
FIG. 15B shows a block diagram of one implementation of the computer system in FIG. 15A, including the BD authoring system.

FIG. 15B shows a block diagram of one implementation of the computer system 1500 in FIG. 15A, including the BD authoring system 1512. The computer system 1500 includes a controller 1510, a memory 1520, storage 1530, a media device 1540, a participant interface 1550, an input/output (I/O) interface 1560, and a network interface 1570. These components are interconnected by a common bus 1580. Alternatively, different connection configurations can be used, such as a star pattern with the controller at the center.

The controller 1510 is a programmable processor and controls the operation of the computer system 1500 and its components. The controller 1510 loads instructions from the memory 1520 or an embedded controller memory (not shown) and executes these instructions to control the system. In its execution, the controller 1510 provides the BD authoring system 1512 as a software system. Alternatively, this service can be implemented as separate components in the controller 1510 or the computer system 1500.

Memory 1520 stores data temporarily for use by the other components of the computer system 1500. In one implementation, memory 1520 is implemented as RAM. In one implementation, memory 1520 also includes long-term or permanent memory, such as flash memory and/or ROM.

Storage 1530 stores data temporarily or long term for use by other components of the computer system 1500, such as for storing BD data used by the BD authoring system 1512. In one implementation, storage 1530 is a hard disk drive.

The media device 1540 receives removable media and reads and/or writes data to the inserted media. In one implementation, the media device 1540 is an optical disc drive.

The user interface 1550 includes components for accepting user input from the user of the computer system 1500 and presenting information to the user. In one implementation, the user interface 1500 includes a keyboard, a mouse, audio speakers, and a display. The controller 1510 uses input from the user to adjust the operation of the computer system 1500.

The I/O interface 1560 includes one or more I/O ports to connect to corresponding I/O devices, such as external storage or supplemental devices (e.g., a printer or a PDA). In one implementation, the ports of the I/O interface 1560 include ports such as: USB ports, PCMCIA ports, serial ports, and/or parallel ports. In another implementation, the I/O interface 1560 includes a wireless interface for communication with external devices wirelessly.

The network interface 1570 includes a wired and/or wireless network connection, such as an RJ-45 or "Wi-Fi" interface (802.11) supporting an Ethernet connection.

The computer system 1500 includes additional hardware and software typical of computer systems (e.g., power, cooling, operating system), though these components are not specifically shown in FIG. 15B for simplicity. In other implementations, different configurations of the computer system can be used (e.g., different bus or storage configurations or a multi-processor configuration).

Various illustrative implementations of the present invention have been described. However, one of ordinary skill in the art will recognize that additional implementations are also possible and within the scope of the present invention. For example, although the disc authoring system has been described exclusively in terms of the BD format, the system can be used to author discs in formats other than the BD format (e.g., the DVD or HD-DVD formats).

Accordingly, the present invention is not limited to only those implementations described above.

What is claimed is:

1. A method of managing a project for authoring a Blu-ray disc (BD), the method comprising:

defining an initial layout of a project including identifying a collection of BD assets that will be included in the project;

exporting a plurality of portfolios from the initial layout of the project, wherein each portfolio of the plurality of portfolios includes portions of the project associated with particular tasks and grouped into separate directories and subdirectories having different collections of BD assets to allow users to create content for the BD in a parallel fashion;

synchronizing data in the initial layout of the project to data in said each portfolio to facilitate combining data between the project and the plurality of portfolios;

generating and validating the different collections of BD assets in the parallel fashion;

updating the separate directories and sub-directories of said each portfolio; and importing said each portfolio into the project.

2. The method of claim 1, further comprising providing mechanisms to link the different collections of BD assets in said each portfolio to BD asset in the project.

3. The method of claim 1, wherein the collection of BD assets comprises menu data.

4. The method of claim 3, wherein the menu data comprises menu buttons with associated logic.

5. The method of claim 1, wherein the collection of BD assets comprises video data.

6. The method of claim 1, wherein the collection of BD assets comprises audio data.

7. The method of claim 1, wherein the collection of BD assets comprises game data.

8. The method of claim 1, wherein generating and validating the different collections of BD assets comprises verifying that the BD assets have a compatible format.

9. The method of claim 1, wherein generating and validating the different collections of BD assets comprises verifying logic commands within the separate directories and sub-directories of said each portfolio.

10. The method of claim 1, wherein generating and validating the different collections of BD assets in a parallel fashion comprises allowing multiple vendors or entities to work on different portions of the project at the same time.

11. The method of claim 1, wherein updating the separate directories and sub-directories of said each portfolio comprises changing the particular tasks associated with the separate directories and sub-directories.

12. The method of claim 1, wherein said each portfolio includes pointers to the collection of BD assets.

13. A system of managing a project for authoring Blu-ray disc (BD), the system comprising:

a client workstation configured to receive information about BD assets that are included with a project, to generate a project list, and to export portfolios from the project list;

a plurality of vendor workstations, each vendor work station configured to receive the portfolios, wherein each portfolio includes a subset of items on the project list associated with particular tasks and grouped into separate directories and sub-directories having different collections of BD assets to allow vendors to create content for the BD in a parallel fashion, said each vendor workstation operating to synchronize data in the project to data in said each portfolio to facilitate combining data between the project and the plurality of portfolios, generate and validate the different collections of BD assets in the parallel fashion with other vendor workstations within the plurality of vendor workstations, and to output an updated portfolio including the different collections of BD assets; and a disc authoring workstation configured to receive updated portfolios from the plurality of vendor workstations, and to assemble the updated portfolios into a master project.

14. The system of claim 13, wherein information in the updated portfolios is validated prior to assembling the updated portfolios into the master project.

15. The system of claim 13, wherein a portfolio from the master project is exported and sent to a vendor.

16. The system of claim 15, wherein the portfolio from the master project is exported in response to a change in the master project.

17. The system of claim 15, wherein the portfolio from the master project is exported in response to an error in a received updated portfolio.

18. The system of claim 17, wherein an error in a received updated portfolio comprises a link to an undefined project asset.

19. A non-transitory storage medium storing a computer program for managing a project for authoring Blu-ray disc (BD), the computer program comprising executable instructions that cause a computer to:

define an initial layout of a project including identifying a collection of BD assets that will be included in the project;

export a plurality of portfolios from the initial layout of the project, wherein each portfolio of the plurality of portfolios includes portions of the project associated with particular tasks and grouped into separate directories and sub-directories having different collections of BD assets to allow users to create content for the BD in a parallel fashion;

synchronize data in the initial layout of the project to data in said each portfolio to facilitate combining data between the project and the plurality of portfolios;

generate and validating the different collections of BD assets in the parallel fashion;

update the separate directories and sub-directories of said each portfolio; and import said each portfolio into the project.

* * * * *